US008934909B2

(12) United States Patent
Koskela et al.

(10) Patent No.: US 8,934,909 B2
(45) Date of Patent: Jan. 13, 2015

(54) METHOD AND APPARATUS FOR PROVIDING COMMUNICATION OFFLOADING TO UNLICENSED BANDS

(75) Inventors: Timo Koskela, Oulu (FI); Vinh Van Phan, Oulu (FI); Gilles Charbit, Hampshire (GB); Sami-Jukka Hakola, Kempele (FI)

(73) Assignee: Nokia Corporation, Espoo (FI)

( * ) Notice: Subject to any disclaimer, the term of this patent is extended or adjusted under 35 U.S.C. 154(b) by 656 days.

(21) Appl. No.: 12/782,877

(22) Filed: May 19, 2010

(65) Prior Publication Data
US 2011/0287794 A1    Nov. 24, 2011

(51) Int. Cl.
| H04W 36/00 | (2009.01) |
| H04W 28/08 | (2009.01) |
| H04W 48/08 | (2009.01) |
| H04W 48/16 | (2009.01) |
| H04W 72/04 | (2009.01) |
| H04W 92/18 | (2009.01) |

(52) U.S. Cl.
CPC .............. *H04W 28/08* (2013.01); *H04W 48/08* (2013.01); *H04W 48/16* (2013.01); *H04W 72/042* (2013.01); *H04W 92/18* (2013.01)
USPC ..... 455/444; 455/63.3; 455/445; 370/395.41; 370/468

(58) Field of Classification Search
CPC ..... H04W 28/08; H04W 48/08; H04W 48/16; H04W 72/042; H04W 92/18
USPC ........... 455/422.1, 450–453, 456.2, 464, 509, 455/510, 63.3, 428, 436–445; 370/395.41, 370/332, 468; 375/E7.141
See application file for complete search history.

(56) References Cited

U.S. PATENT DOCUMENTS

| 5,822,693 | A  | * | 10/1998 | Harrison .................... 455/432.1 |
| 7,239,624 | B2 |   | 7/2007  | Buchwald et al. |
| 7,848,358 | B2 | * | 12/2010 | LaDue .......................... 370/494 |
| 7,916,693 | B2 | * | 3/2011  | Linebarger et al. ........... 370/329 |
| 2004/0192211 | A1 | * | 9/2004  | Gallagher et al. .......... 455/67.11 |
| 2004/0240525 | A1 | * | 12/2004 | Karabinis et al. ............. 375/132 |
| 2006/0025144 | A1 | * | 2/2006  | Gallagher et al. ............. 455/446 |
| 2006/0098598 | A1 | * | 5/2006  | Gallagher .................... 370/331 |
| 2006/0258358 | A1 | * | 11/2006 | Kallio ........................... 455/437 |
| 2007/0213046 | A1 | * | 9/2007  | Li et al. ......................... 455/425 |
| 2007/0264996 | A1 | * | 11/2007 | Vikberg ..................... 455/426.1 |
| 2008/0101279 | A1 | * | 5/2008  | Russell et al. ................ 370/328 |
| 2008/0244148 | A1 | * | 10/2008 | Nix et al. ....................... 710/313 |
| 2009/0196268 | A1 | * | 8/2009  | Caldwell et al. .............. 370/338 |
| 2009/0280819 | A1 | * | 11/2009 | Brisebois et al. ............. 455/446 |
| 2010/0246506 | A1 | * | 9/2010  | Krishnaswamy ............. 370/329 |
| 2010/0278141 | A1 | * | 11/2010 | Choi-Grogan et al. ........ 370/331 |
| 2010/0310057 | A1 | * | 12/2010 | Theppasandra et al. ... 379/88.04 |
| 2011/0028166 | A1 | * | 2/2011  | Ketchum et al. ........... 455/456.5 |
| 2011/0086611 | A1 | * | 4/2011  | Klein et al. .................... 455/407 |
| 2011/0093913 | A1 | * | 4/2011  | Wohlert et al. ................... 726/1 |

FOREIGN PATENT DOCUMENTS

| EP | 1 734 774 A1 | 12/2006 |
| EP | 1 750 466 B1 | 2/2007 |
| GB | 2 444 997 A  | 6/2008 |
| WO | WO 2006/047063 A2 | 5/2006 |
| WO | WO 2006/047064 A2 | 5/2006 |
| WO | WO 2007/122297 A1 | 11/2007 |

OTHER PUBLICATIONS

International Search Report and Written Opinion for Application No. PCT/FI2011/050321 dated Aug. 17, 2011.
U.S. Appl. No. 12/604,733, filed Oct. 23, 2009; In re: Yu; entitled *Systems, Methods, and Apparatuses for Facilitating Device-to-Device Connection Establishment*.
U.S. Appl. No. 12/763,454, filed Apr. 20, 2010; in re: Phan et al., entitled *D2D Communications Considering Different Network Operators*.
uAxes Fast Track to Offload Cellular Data to WiFi Networks, [online] [retrieved Aug. 5, 2010]. Retrieved from the Internet: <URL: http://www.notava.com/notava/uploads/Brochures/uAxesBrochure_v06.pdf>. 2 pages.
IEEE Standard for Architectural Building Blocks Enabling Network-Device Distributed Decision Making for Optimized Radio Resource Usage in Heterogeneous Wireless Access Networks, IEEE Std 1900.4, (2009), pp. 1-119.

* cited by examiner

*Primary Examiner* — Dominic E Rego
(74) *Attorney, Agent, or Firm* — Alston & Bird LLP

(57) ABSTRACT

An apparatus for providing network assisted local communication offloading to unlicensed bands may include at least one processor and at least one memory including computer program code. The at least one memory and the computer program code may be configured, with the processor, to cause the apparatus to perform at least receiving, via signaling associated with licensed band resources, information indicative of unlicensed band resources available in a particular area, and providing resource availability data, via signaling associated with the licensed band resources, to one or more devices within the particular area. The resource availability data may enable unlicensed band resource usage by at least one of the one or more devices. A corresponding method and computer program product are also provided.

20 Claims, 9 Drawing Sheets

METHOD AND APPARATUS FOR PROVIDING COMMUNICATION OFFLOADING TO UNLICENSED BANDS

TECHNOLOGICAL FIELD

Embodiments of the present invention relate generally to inter-device communications technology and, more particularly, relate to an apparatus and method for providing communication offloading to unlicensed bands.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer. However, as the number of wireless communication device users continues to increase, the strain on the limited resources in the licensed spectrum also increases.

To provide increased numbers of services to large numbers of users, efficient use of the licensed spectrum has become an important consideration. However, some projections as to the numbers of devices that can be expected in the future suggest that it may be difficult to provide quality service to all such users with the current amount of licensed spectrum resources and the current policies governing use.

Accordingly, it may be desirable to develop mechanisms for finding alternate ways to provide service to potentially large numbers of users in an environment with scare resources.

BRIEF SUMMARY OF EXAMPLE EMBODIMENTS

A method, apparatus and computer program product are therefore provided that may enable the provision of network assisted local communication offloading to unlicensed bands. In this regard, for example, a central device may acquire information on locally available unlicensed band resources (e.g., from communication devices and/or access points) and direct the usage of such resources by various devices or even access points. Thus, more efficient usage of wireless resources may be enabled.

In one example embodiment, a method of providing network assisted local communication offloading to unlicensed bands is provided. The method may include receiving, via signaling associated with licensed band resources, information indicative of unlicensed band resources available in a particular area, and providing resource availability data, via signaling associated with the licensed band resources, to one or more devices within the particular area. The resource availability data may enable unlicensed band resource usage by at least one of the one or more devices.

In another example embodiment, a computer program product for providing network assisted local communication offloading to unlicensed bands is provided. The computer program product may include at least one computer-readable storage medium having computer-executable program code instructions stored therein. The computer-executable program code instructions may include program code instructions for receiving, via signaling associated with licensed band resources, information indicative of unlicensed band resources available in a particular area, and providing resource availability data, via signaling associated with the licensed band resources, to one or more devices within the particular area. The resource availability data may enable unlicensed band resource usage by at least one of the one or more devices.

In another example embodiment, an apparatus for providing network assisted local communication offloading to unlicensed bands is provided. The apparatus may include at least one processor and at least one memory including computer program code. The at least one memory and the computer program code may be configured, with the processor, to cause the apparatus to perform at least receiving, via signaling associated with licensed band resources, information indicative of unlicensed band resources available in a particular area, and providing resource availability data, via signaling associated with the licensed band resources, to one or more devices within the particular area. The resource availability data may enable unlicensed band resource usage by at least one of the one or more devices.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
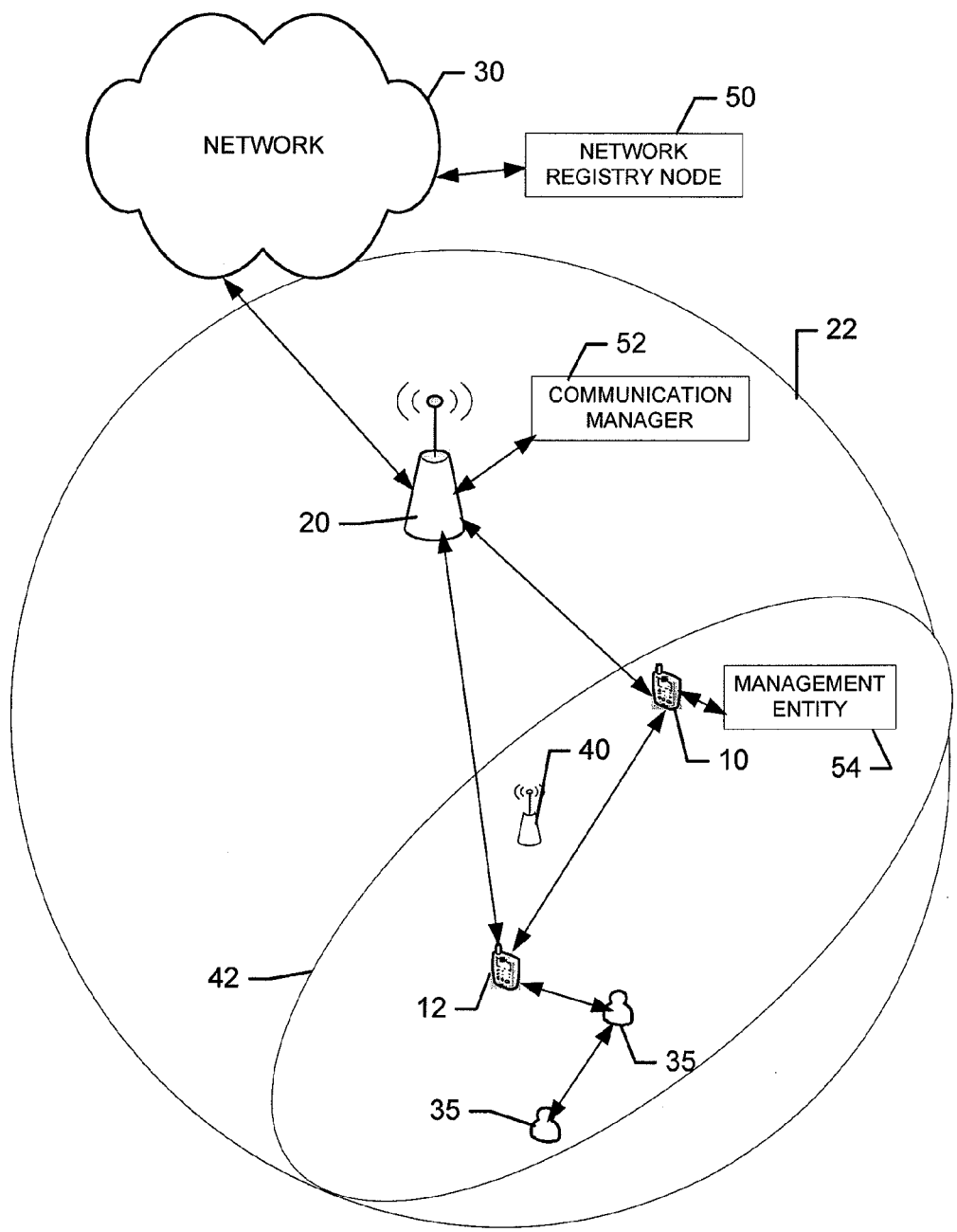
FIG. 1 illustrates one example of a communication system according to an example embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

As indicated above, the licensed spectrum, which is supervised by various network operators, is a limited resource. Accordingly, some embodiments of the present invention may provide for the offloading of some communication that would otherwise normally occur via licensed bands to unlicensed bands. Moreover, some embodiments may provide for network coordination and/or assistance for the use of unlicensed and licensed bands for communication. Some embodiments may be useful in connection with device-to-device (D2D) and/or machine-to-machine (M2M) communication, although embodiments may be useful in other environments as well. M2M communication may involve the connection of a device or group of devices to a remote server or computer system to enable remote measurement or remote reporting of information. In some cases, M2M communication involves the use of one or more sensors or other nodes or devices to gather information that can be passed to a network or computing device via some form of gateway device. In some cases, the sensors may communicate with the gateway over unlicensed bands and the gateway may communicate with the network over licensed bands. D2D communication often involves direct communication between a first UE (user equipment) and a second UE without signaling from a network device such as an access point, base station or communication node. D2D communication may also occur over unlicensed bands.

Many devices (e.g., UEs or other mobile terminals, base stations or other access points such as node Bs (NBs) or evolved node Bs (eNBs), etc.) may include multiple radios or may otherwise have configurable antennas to permit operation over multiple frequencies. Accordingly, an embodiment of the present invention may provide network assistance or direction that may enable the integration of both licensed and unlicensed bands in relation to providing service to mobile devices.

FIG. 1 illustrates a generic system diagram in which a device such as a mobile terminal 10 (or UE), is shown in an example communication environment in which embodiments of the present invention may be employed. As shown in FIG. 1, an embodiment of a system in accordance with an example embodiment of the present invention may include a first communication device (e.g., mobile terminal 10) and a second communication device 12 that may each be capable of communication with a network 30. The second communication device 12 is provided as an example to illustrate potential multiplicity with respect to instances of other devices that may be included in the network 30 and that may practice example embodiments. The communications devices of the system may be able to communicate with network devices or with each other via the network 30. In some cases, the communication devices may be provided with access to the network via a base station or other communication node (e.g., eNB 20). The eNB 20 may have a coverage area 22 that defines a region within which communication devices may utilize the eNB 20 to access the network 30.

In some embodiments, one or more of the communication devices (e.g., the second communication device 12) may be in communication with one or more machines or sensors (e.g., sensors 35). The sensors may be devices that detect or sense local conditions and can communicate data indicative of the conditions sensed to other devices or the network. In some embodiments, the second communication device 12 may act as a relay or gateway device and one or more of the sensors 35 capable of communication with the gateway device may provide data to the network 30 or other devices via the gateway device and perhaps also each other. In some cases, communication between the sensors 35 and perhaps also communication between the sensors 35 and the gateway device (e.g., the second communication device 12) may be conducted via unlicensed bands in accordance with an example embodiment.

In an example embodiment, other access points may be located within the coverage area 22 of the eNB 20. These other access points may include femto or pico base stations (or any other access point associated with a local network or the network 30). Access point 40 is an example of such an access point and the coverage area 42 of the access point 40 is shown in FIG. 1 by way of example. However, although the mobile terminal 10 and the second communication device 12 are each shown as being within the coverage area 22 of the eNB 20 and also within the coverage area 42 of the access point 40, it should be appreciated that either device (and other devices) could alternatively be located in a different coverage area and inter-device communication could be provided via the network 30 in some cases.

The network 30 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. One or more communication terminals such as the mobile terminal 10, the second communication device 12 and/or the sensors 35 may be in communication with each other via the network 30 or via D2D and/or M2M communication. In some cases, each of the communication terminals may include an antenna or antennas for transmitting signals to and for receiving signals from a base site (e.g., access point 40 or eNB 20). The base site could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing elements (e.g., personal computers, server computers or the like) may be coupled to the mobile terminal 10, the second communication device 12 and/or the sensors 35 via the network 30 and the access point 40. In some embodiments, the network 30 may employ one or more mobile access mechanisms such as wideband code division multiple access (W-CDMA), CDMA2000, global system for mobile communications (GSM), general packet radio service (GPRS), long term evolution (LTE), LTE Advanced (LTE-A) and/or the like may be supported.

In some example embodiments, the mobile terminal 10 (and/or the second communication device 12) may be a mobile communication device such as, for example, a personal digital assistant (PDA), wireless telephone, mobile computing device, camera, video recorder, audio/video player, positioning device (e.g., a global positioning system (GPS) device), game device, television device, radio device, or various other like devices or combinations thereof. As such, the mobile terminal 10 may include one or more processors and one or more memories for storing instructions, which when executed by the processor, cause the mobile terminal 10 to operate in a particular way or execute specific functionality. The mobile terminal 10 may also include communication circuitry and corresponding hardware/software to enable communication with other devices.

The sensors 35 may each be a mobile device such as a mobile sensor or other small battery operated device configured to detect local parameters or environmental conditions for reporting to a remote location. As such, the sensor may include some form of detection device or circuitry to measure a physical parameter or other measurable value along with some communication circuitry for enabling the sensor to communicate information to the network 30. The sensor may also include one or more memories and one or more processing circuitries in some instances, and the processing circuitry may direct operation of the corresponding sensors. In some cases, the sensors 35 may be replaced by some other type of machine that may be a mobile or fixed communication device. Multiple sensors 35 and communication devices are also shown in FIG. 1 to illustrate that one access point may serve a plurality of communication devices either employing normal cellular network communications and/or in a capacity as a gateway device.

As shown in FIG. 1, one or more of the machines (e.g., sensors 35) may be positioned within the coverage area 42 of the access point 40 along with one or more other communication devices (e.g., mobile terminal 10 and the second communication device 12). In an exemplary embodiment, the eNB 20 may typically operate in the licensed spectrum (although the eNB 20 may have the capability to also provide services in the unlicensed spectrum). Meanwhile, the access point 40 may be configured to provide services via either the licensed or unlicensed spectrum. An example embodiment of the present invention may include a network registry node 50 that may be a network device configured to communicate with communication devices (e.g., mobile terminal 10 and the second communication device 12) and/or base sites (e.g., the eNB 20 and/or the access point 40) to facilitate coordination of the usage of both the licensed and unlicensed spectrum for resource management. Thus, for example, the network registry node 50 may enable local heterogeneous communication on the unlicensed spectrum supervised by network operators or third parties operating on the licensed spectrum.

In an example embodiment, the network registry node 50 may be configured to act as a central entity in the network to be shared by network operators or third parties to facilitate cooperation with respect to collecting information about usage of unlicensed bands in the local area. The network registry node 50 may therefore, for example, collect information on the existence and/or availability of local area radio resources in particular unlicensed bands of interest and utilize the collected information to inform devices (e.g., the eNB 20) in the local area to utilize certain unlicensed resources. The network registry node 50 may also be configured to communicate with the communication devices (e.g., the mobile terminal 10 and/or the second communication device 12) to direct the communication devices to report information to the network registry node 50. Thus, for example, the network registry node 50 may be configured to direct the mobile terminal 10 to inform the network registry node 50 of other radio access networks in the area so the network registry node 50 can record such information for use in resource management decisions.

In an example embodiment, the network registry node 50 may be configured to register radio access networks (RANs) in the local area based on reports received from devices attached to or otherwise aware of the presence of each respective radio access network. Thus, for example, if the mobile terminal 10 is in communication with the network 30 via the eNB 20 and also is in communication with, or is capable of establishing communication with the access point 40 (which may perhaps be a communication node of a locally available wireless LAN (WLAN)), the mobile terminal 10 may provide a report to inform the network registry node 50 of the presence of the access point 40. The mobile terminal 10 also report characteristics associated with the access point 40 so that the network registry node 50 records information about the access point 40 for potential utilization in accordance with the example embodiment. Accordingly, the network registry node 50 may act as a central entity configured to determine a location based picture of active and non-active unlicensed band usage based on location information. The location information may be associated with a report received from a communication device. In some embodiments, the communication manager 50 may be a component, device or apparatus forming a portion of a network server, a D2D registration server function (DRSF), mobility management entity (MME) or other network device.

In an example embodiment, the eNB 20 or any other base site associated with licensed spectrum communication may access information recorded by the network registry node 50 to make determinations regarding resources that are to be used for communication among communication devices in the coverage area 22 of the eNB 20. In an example embodiment, the eNB 20 may include a communication manager 52 configured to communicate with the network registry node 50 to receive information on the radio access networks available in a particular area. The information may also identify characteristics regarding available networks so that the communication manager 52 is enabled to direct specific devices to utilize corresponding specific resources (e.g., including resources of the unlicensed spectrum) to alleviate loading on the licensed spectrum. Thus, for example, the communication manager 52 may be configured to direct the mobile terminal 10 to engage in D2D communication with the second communication device 12 via specific unlicensed assets, direct the mobile terminal 10 to utilize specific unlicensed assets that may be associated with the access point 40, and/or direct the second communication device 12 to manage M2M communication using unlicensed assets with respect to the sensors 35.

In some embodiments, the communication devices (e.g., the mobile terminal 10 and/or the second communication device 12) may include a management entity 54 configured to interface with the communication manager 52 and/or the network registry node 50 to facilitate operation of example embodiments. For example, the management entity 54 may be configured to receive and respond to commands or requests for information received from the network registry node 50. Thus, the management entity 54 may receive requests or commands regarding the provision of information identifying networks (and perhaps also network operating characteristics) for radio access networks in the local area of which the management entity 54 is aware. The management entity 54 may also be configured to provide the information to the network registry node 50 in response to the collection of such information. In some embodiments, the management entity 54 is also configured to respond to directions or instructions received from the communication manager 52. Thus, for example, the management element entity 54 may be configured to cause the communication device associated therewith to utilize resources specifically indicated by the communication manager 52.

Figure 2:
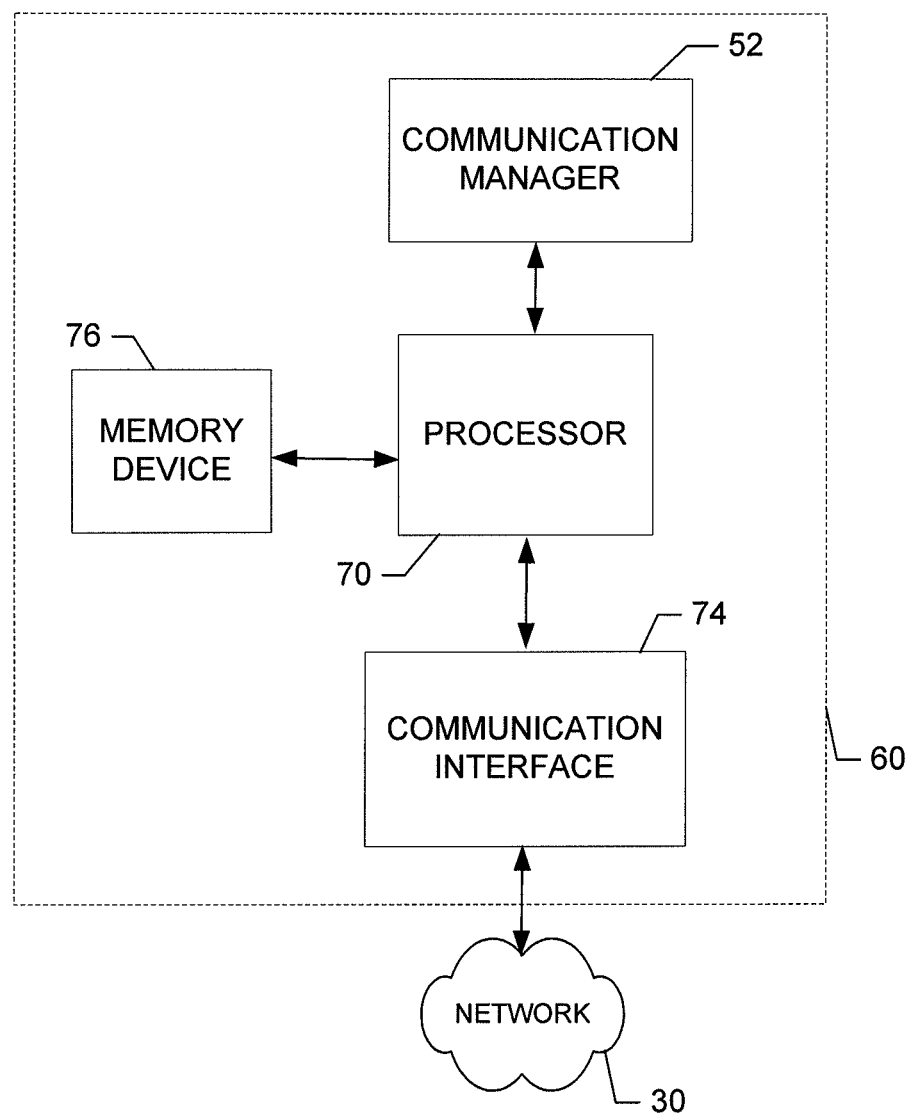
FIG. 2 illustrates a block diagram showing an access point based apparatus for providing communication offloading to unlicensed bands in accordance with an example embodiment of the present invention.

In an example embodiment, the eNB 20 may be configured to include or otherwise employ an apparatus according to an example embodiment of the present invention. FIG. 2 illustrates a schematic block diagram of an apparatus for providing network assisted local communication offloading to unlicensed bands according to an example embodiment of the present invention. An example embodiment of the invention will now be described with reference to FIG. 2, in which certain elements of an apparatus 60 for providing network assisted local communication offloading to unlicensed bands are displayed. The apparatus 60 of FIG. 2 may be employed, for example, on an access point, base site, communication node or a variety of other devices. However, it should be noted that the components, devices or elements described below may not be mandatory and thus some may be omitted in certain embodiments. Additionally, some embodiments may include further components, devices or elements beyond those shown and described herein.

Referring now to FIG. 2, the apparatus 60 may include or otherwise be in communication with a processor 70, a communication interface 74 and a memory device 76. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device). The memory device 76 may be configured to store information, data, applications, instructions or the like for enabling the apparatus to carry out various functions in accordance with example embodiments of the present invention. For example, the memory device 76 could be configured to buffer input data for processing by the processor 70. Additionally or alternatively, the memory device 76 could be configured to store instructions for execution by the processor 70.

The processor 70 may be embodied in a number of different ways. For example, the processor 70 may be embodied as one or more of various processing means such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., an eNB, AP or other network device) adapted for employing embodiments of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

In an example embodiment, the processor 70 may be embodied as, include or otherwise control the communication manager 52. As such, in some embodiments, the processor 70 may be said to cause, direct or control the execution or occurrence of the various functions attributed to the communication manager 52 as described herein. The communication manager 52 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the communication manager 52 as described herein. Thus, in examples in which software is employed, a device or circuitry (e.g., the processor 70 in one example) executing the software forms the structure associated with such means.

In an example embodiment, the communication manager 52 is configured to control the allocation of wireless communication resources to enable the communications described above in accordance with an example embodiment of the present invention. As such, for example, the communication manager 52 is configured to access information regarding available radio resources from the network registry node 50 and then, based on the available resources, allocate resources for use by communication devices, machines or sensors to offload some communication to unlicensed bands. In some embodiments, the communication manager 52 may be configured to direct local devices to engage in M2M and/or D2D communication using unlicensed spectrum resources in order to alleviate demands for licensed spectrum usage. Thus, for example, the communication manager 52 may be configured to configure the specific band and bandwidth for unlicensed operation of devices originally in communication with the eNB 20 using licensed bands. The communication manager 52 may also continue to receive dynamically updated information from the network registry node 50 regarding unlicensed band utilization and availability to configure devices for offloading them to unlicensed band communication on an as needed basis.

In some situations, limitations may be set by the regulation in an unlicensed band where certain licensed band (e.g., LTE) communication is allocated. For example, if communication is offloaded to a particular unlicensed (e.g., WLAN) band, the corresponding device(s) could use a WLAN transceiver to check nearby WLAN hotspots or active channels and potentially report the WLAN measurement report(s) to the network registry node 50. The "un-active" channels could be used for D2D LTE or for communication via a local communication access point. The network registry node 50 may schedule time/frequency resources on the unlicensed band that fit within the un-active WLAN channel. Also, the D2D LTE transmit power on the unlicensed band may be set to be within the WLAN transmit power limit.

Figure 3:
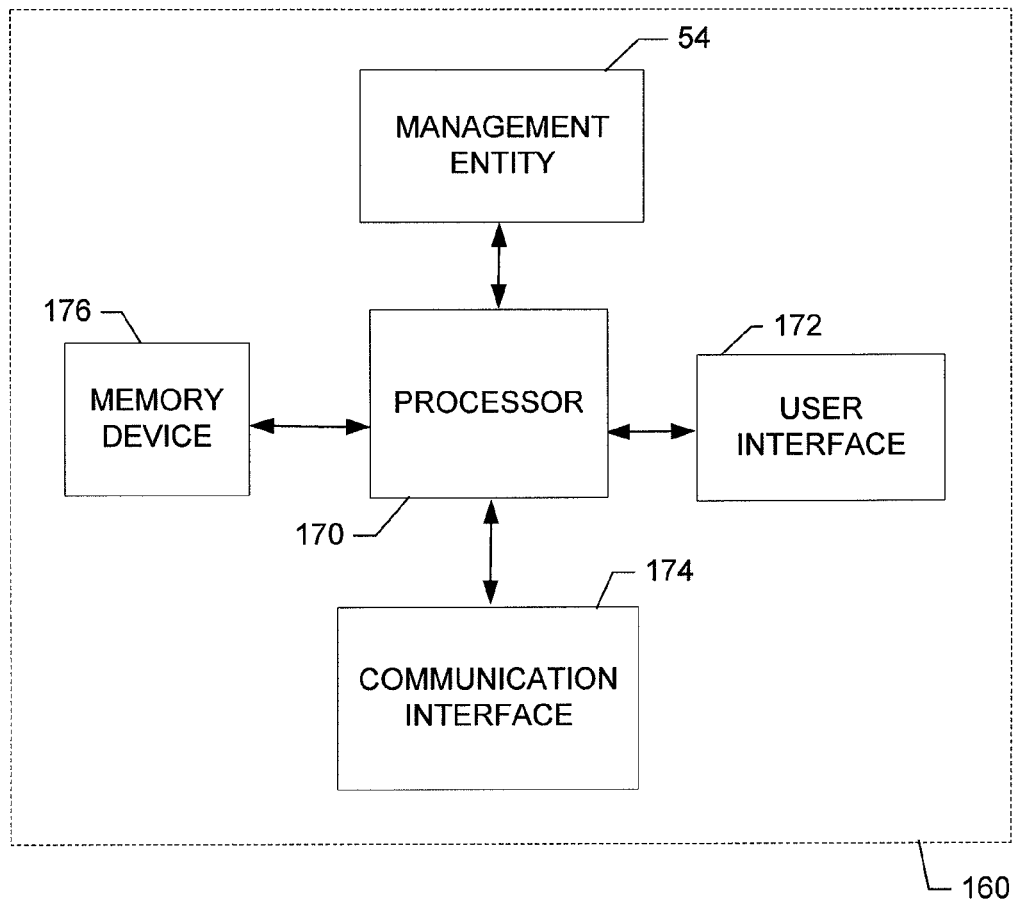
FIG. 3 illustrates a block diagram showing a mobile terminal based apparatus for providing communication offloading to unlicensed bands in accordance with an example embodiment of the present invention.

FIG. 3 is a block diagram of an apparatus 160 that may be employed in connection with a communication device (e.g., mobile terminal 10 and/or the second communication device 12) practicing an example embodiment of the present invention. The apparatus 160 may include or otherwise be in communication with a processor 170, a user interface 172, a communication interface 174 and a memory device 176. The processor 170, the communication interface 174, and the memory device 176 may each be similar in general function and form to the processor 70, the communication interface 74 and the memory device 76 described above (except perhaps with semantic and scale differences), so a detailed explanation of these components will not be provided. The user interface 172 may be in communication with the processor 170 to receive an indication of a user input at the user interface 172 and/or to provide an audible, visual, mechanical or other output to the user. As such, the user interface 172 may include, for example, a keyboard, a mouse, a joystick, a display, a touch screen, soft keys, a microphone, a speaker, or other input/output mechanisms. In this regard, for example, the processor 170 may comprise user interface circuitry configured to control at least some functions of one or more elements of the user interface, such as, for example, a speaker, ringer, microphone, display, and/or the like. The processor 170 and/or user interface circuitry comprising the processor 170 may be configured to control one or more functions of one or more elements of the user interface through computer program instructions (e.g., software and/or firmware) stored on a memory accessible to the processor 170 (e.g., memory device 176, and/or the like).

In an example embodiment, the processor 170 may be embodied as, include or otherwise control the management entity 54. The management entity 54 may be any means such as a device or circuitry operating in accordance with software or otherwise embodied in hardware or a combination of hardware and software (e.g., processor 170 operating under software control, the processor 170 embodied as an ASIC or FPGA specifically configured to perform the operations described herein, or a combination thereof) thereby configuring the device or circuitry to perform the corresponding functions of the communication manager 52 as described herein. Thus, in examples in which software is employed, a device or circuitry (e.g., the processor 170 in one example) executing the software forms the structure associated with such means. The management entity 54 may be configured to utilize the resources allocated by the communication manager 52 above to communicate with other communication devices, access points and/or sensors or machines using identified radio access network resources.

In some embodiments, the management entity 54 may be further configured to provide reports to the network registry node 50 regarding radio access networks detected by the mobile terminal 10 and perhaps also their corresponding parameters. Thus, for example, the management entity 54 may provide information descriptive of radio access networks available to the mobile terminal 10, on a continuous or periodic basis (either autonomously or when reports are needed by the network registry node 50), to the network registry node 50 to enable the network registry node 50 to store such information for use by the communication manager 52 for offloading communications to unlicensed bands where appropriate. As such, the management entity 54 may be configured to make measurements of signals received from available radio access networks including measurements in unlicensed bands. In some embodiments, the management entity 54 may also interface with the communication manager 52 to receive direction regarding which radio resources to utilize for communications to be conducted by the mobile terminal 10. Thus, for example, the communication manager 52 may provide an indication of the center frequency of a corresponding unlicensed band that the mobile terminal 10 is to use for communication, for example, with another device (e.g., the second communication device 12 or a machine or sensor).

In an example embodiment, the mobile terminal 10 (or the second communication device 12) may commence communication with another device using unlicensed band resources identified by the communication manager 52 (e.g., via the management entity 54), but maintain communication with an access point associated with the communication manager 52 (e.g., the eNB 20) via licensed band in order to receive control commands. Thus, for example, the mobile terminal 10 may receive direction from the communication manager 52 to shift to communication with the second communication device 12 using D2D communication using unlicensed band resources (e.g., WLAN), but the mobile terminal 10 may still maintain a connection via licensed band to the eNB 20 to receive control related information from the communication manager 52. In some embodiments, the communication manager 52 may define on and off periods for the mobile terminal 10 to check for control information. Thus, during off periods, the mobile terminal 10 may communicate with another device using resources indicated by the communication manager 52. However, during on periods, the mobile terminal 10 may listen for control information from the communication manager 52.

Figure 4:
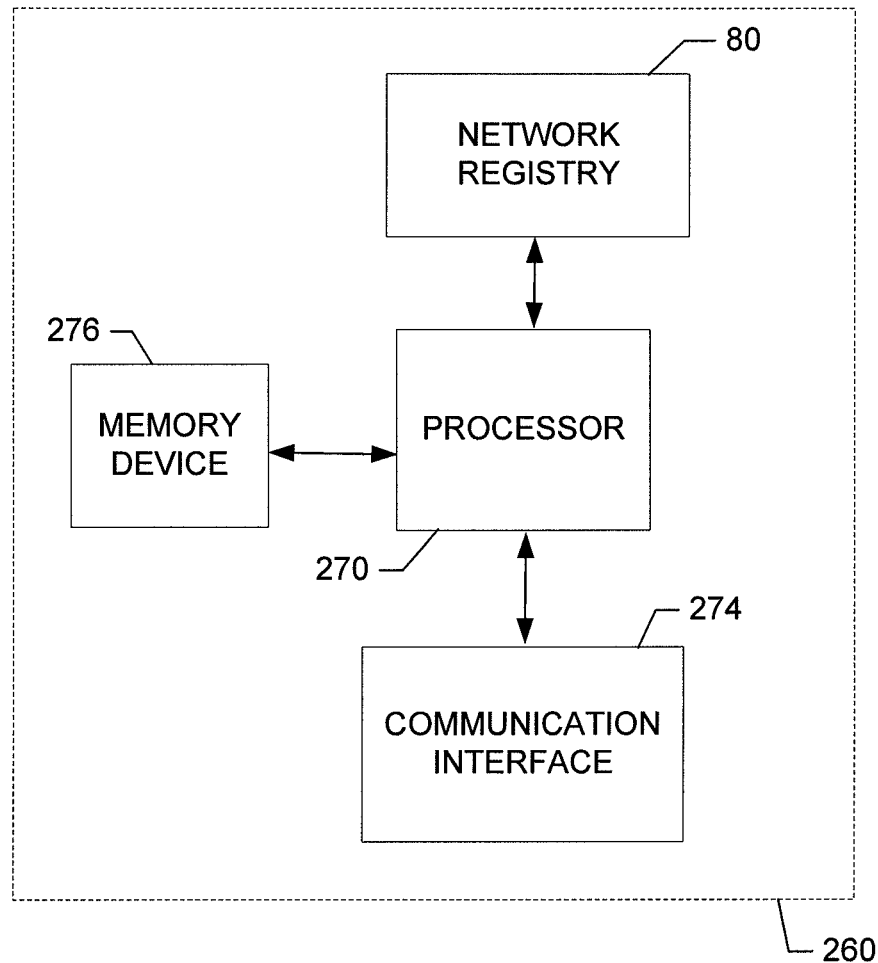
FIG. 4 illustrates a block diagram showing a network entity based apparatus for providing communication offloading to unlicensed bands in accordance with an example embodiment of the present invention.

FIG. 4 is a block diagram of an apparatus 260 that may be employed in connection with a network entity (e.g., an MME or DRSF hosting the network registry node 50) practicing an example embodiment of the present invention. The apparatus 260 may include or otherwise be in communication with a processor 270, a communication interface 274 and a memory device 276. The processor 270, the communication interface 274, and the memory device 276 may each be similar in general function and form to the processor 70, the communication interface 74 and the memory device 76 described above (except perhaps with semantic and scale differences), so a detailed explanation of these components will not be provided.

In an example embodiment, the processor 270 may be embodied as, include or otherwise control a network registry 80. The network registry 80 may be any means such as a device or circuitry operating in accordance with software or otherwise embodied in hardware or a combination of hardware and software (e.g., processor 270 operating under software control, the processor 270 embodied as an ASIC or FPGA specifically configured to perform the operations described herein, or a combination thereof) thereby configuring the device or circuitry to perform the corresponding functions of the network registry 80 as described herein. Thus, in examples in which software is employed, a device or circuitry (e.g., the processor 270 in one example) executing the software forms the structure associated with such means. The network registry 80 may be configured to register radio access networks (RANs) in the local area based on reports received from devices attached to or otherwise aware of the presence of each respective radio access network. The network registry 80 may be configured to determine a view of active and non-active unlicensed band usage based on location information associated with each report received from communication devices and provide such information for use by the communication manager 52 as described above. In some embodiments, the network registry 80 may also include a view of active and non-active licensed band usage.

Figure 5:
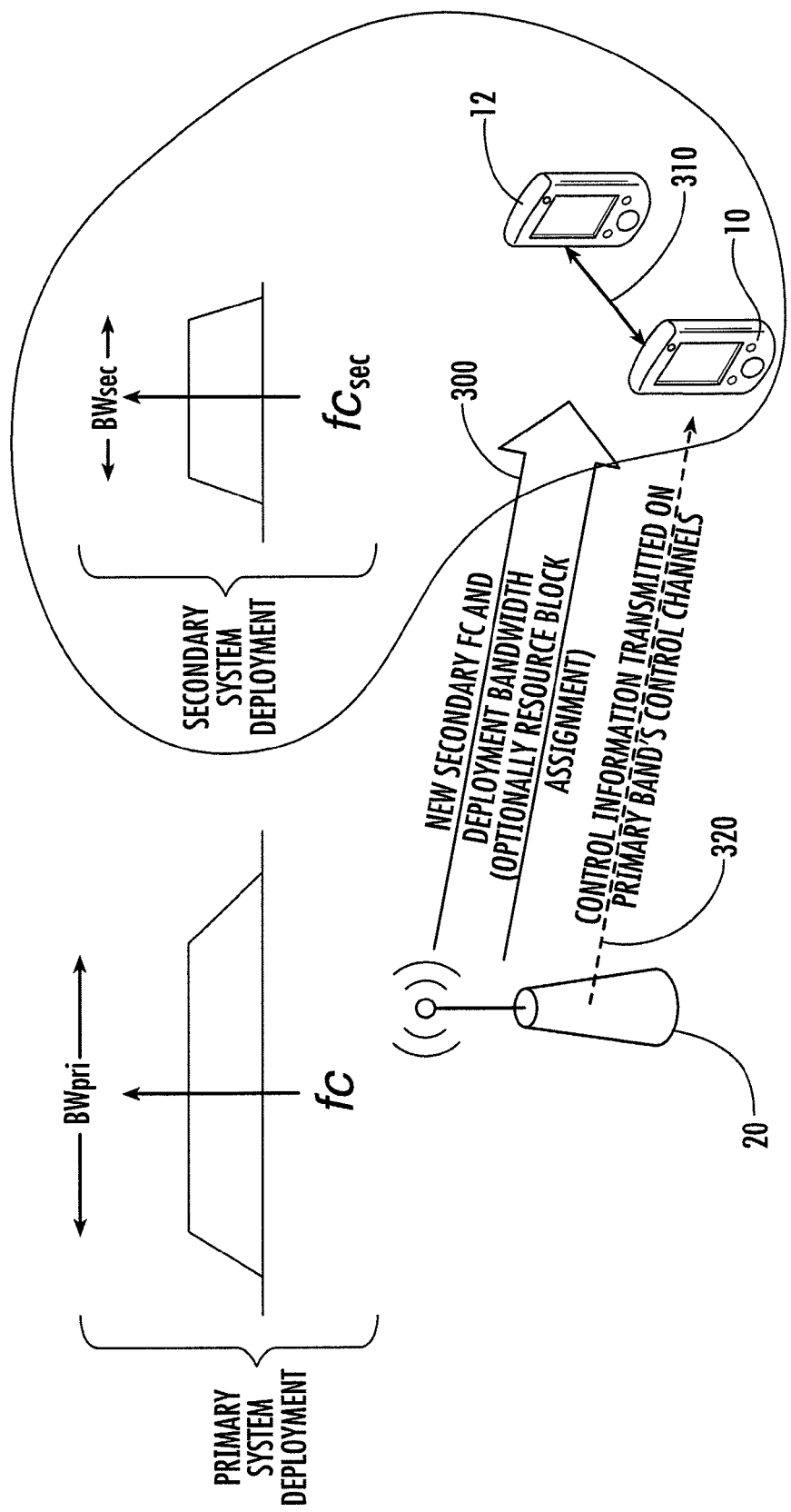
FIG. 5 illustrates operation of a communication manager according to an example embodiment of the present invention.

FIG. 5 illustrates operation of the communication manager 52 according to an example embodiment. In this regard, the eNB 20 (via the communication manager 52) may utilize information on unlicensed band resources that are available for use by the mobile terminal 10 (such information being provided by the network registry node 50) to determine a secondary frequency for use by the mobile terminal 10 in communication with the second communication device 12. The eNB 20 may then send, over primary system deployment (e.g., in the LTE or LTE-A domain), an indication of the resources the mobile terminal 10 is to use for communication with the second communication device 12 as indicated at instruction 300. The instruction 300 may be provided via control signaling in the licensed spectrum of the primary band (e.g., defined by the primary center frequency fc and the primary bandwidth $BW_{pri}$). The instruction 300 may define unlicensed resources to be used by the mobile terminal 10 (such resources being defined by a secondary center frequency $fc_{sec}$ and the secondary bandwidth $BW_{sec}$). A D2D connection 310 may then be established between the mobile terminal 10 and the second communication device 12. However, control information 320 may continue to be provided to the mobile terminal 10 via control channels of the primary band. In some embodiments, the resources in the unlicensed band could be divided to resource blocks (e.g., similar to an LTE system). Devices may then receive additional resource allocations from the network via the communication manager 52 and the communication manager 52 may signal the allocated resource blocks. As an alternative, knowing the center frequency, devices could use contention based mechanisms to compete for resource blocks on the secondary band. Devices may listen via the downlink of the primary system for control information and use the secondary band for data communication. The network may also identify and notify potentially impacted other local system(s) about the assigned local communication, as the serving radio access network and the other systems may cooperate effectively to occupy resources and serve their users.

Figure 6:
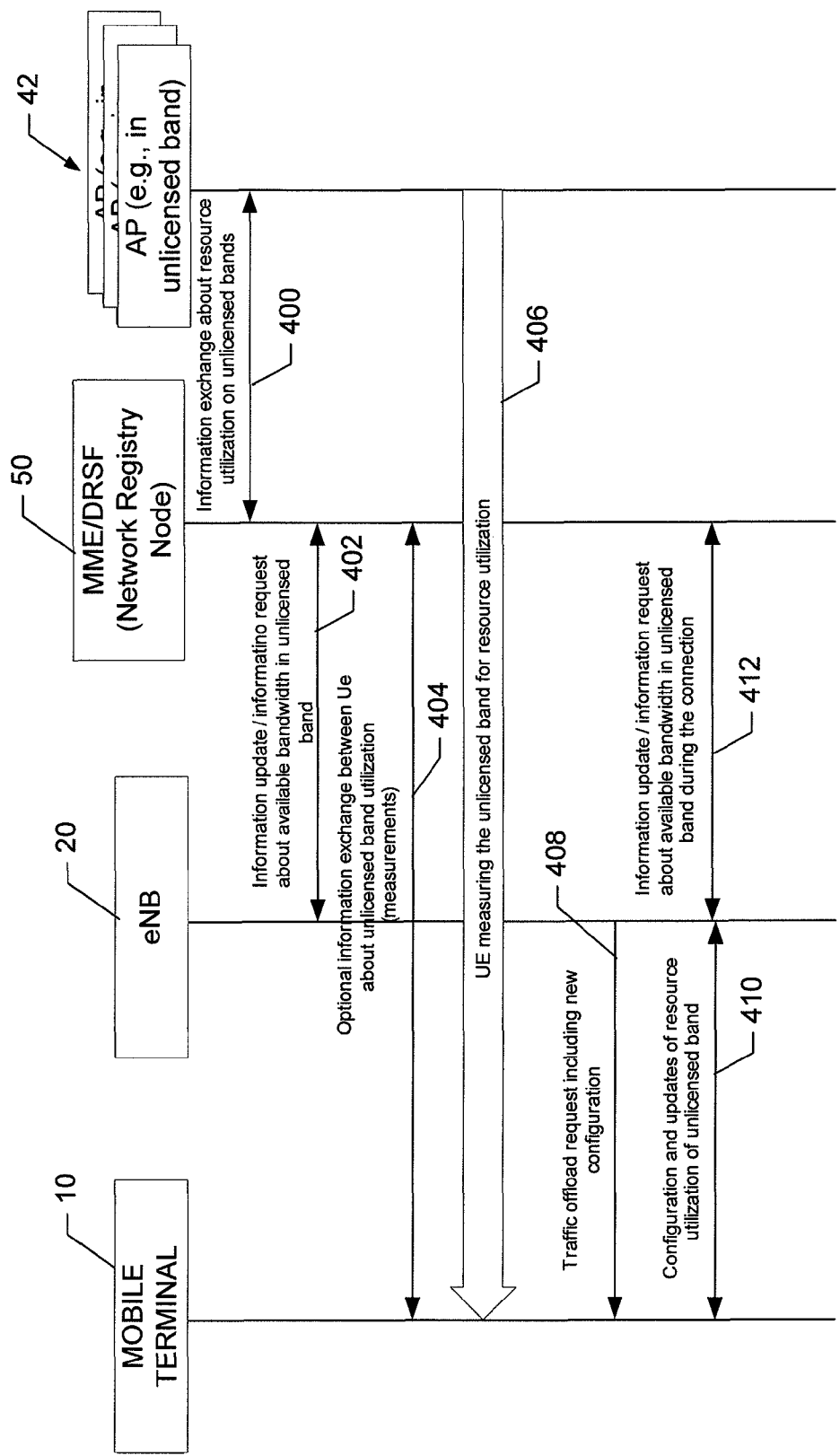
FIG. 6 is a control flow diagram showing some communication exchanges for offloading by assigning a device (or devices) to an unlicensed band according to an example embodiment of the present invention.

FIG. 6 is a control flow diagram showing some communication exchanges for offloading by assigning a device (or devices) to an unlicensed band according to an example embodiment of the present invention. As shown in FIG. 6, the network registry node 50 may initially exchange information with any access points 42 in unlicensed bands at operation 400. The information may indicate resource utilization of unlicensed bands. At operation 402, the network registry node 50 may exchange information regarding available bandwidth in unlicensed bands with the eNB 20. In some cases, the information exchange may be providing a request for reports from communication devices or updating of information collected at the network registry node 50 for use in making asset utilization determinations. In some cases, there may be an optional exchange of information directly between the mobile terminal 10 and the network registry node 50 as shown at operation 404. At operation 406, which may be accomplished periodically, occasionally or continuously, the mobile terminal 10 (or UE) may measure unlicensed band resources. The eNB 20, based on information provided by the network registry node 50, may direct traffic to be offloaded to unlicensed band resources by providing a traffic offload request 408 to the mobile terminal 10 to define a new configuration. At operation 410, configuration information and updates of resource utilization of the unlicensed band may be exchanged between the eNB 20 and the mobile terminal 10. Information regarding available bandwidth in unlicensed bands may then continue to be exchanged between the eNB 20 and the network registry node 50 at operation 412. Again, the information exchange may be providing a request for reports from communication devices or updating of information collected at the network registry node 50 for use in making asset utilization determinations.

In this example embodiment, the eNB may indicate that traffic offloading to unlicensed band is needed on a PDSCH (physical downlink shared channel) via RRC (radio resource control) procedures. The mobile terminal may make supporting measurements on the unlicensed band (e.g. if it has WLAN radio and communication would be offloaded to WLAN band) and indicate, for example, which WLAN channels are free on PUSCH (physical uplink shared channel) within the RRC procedure. Information exchange about between DSRF and mobile terminal may use existing signaling channels.

Figure 7:
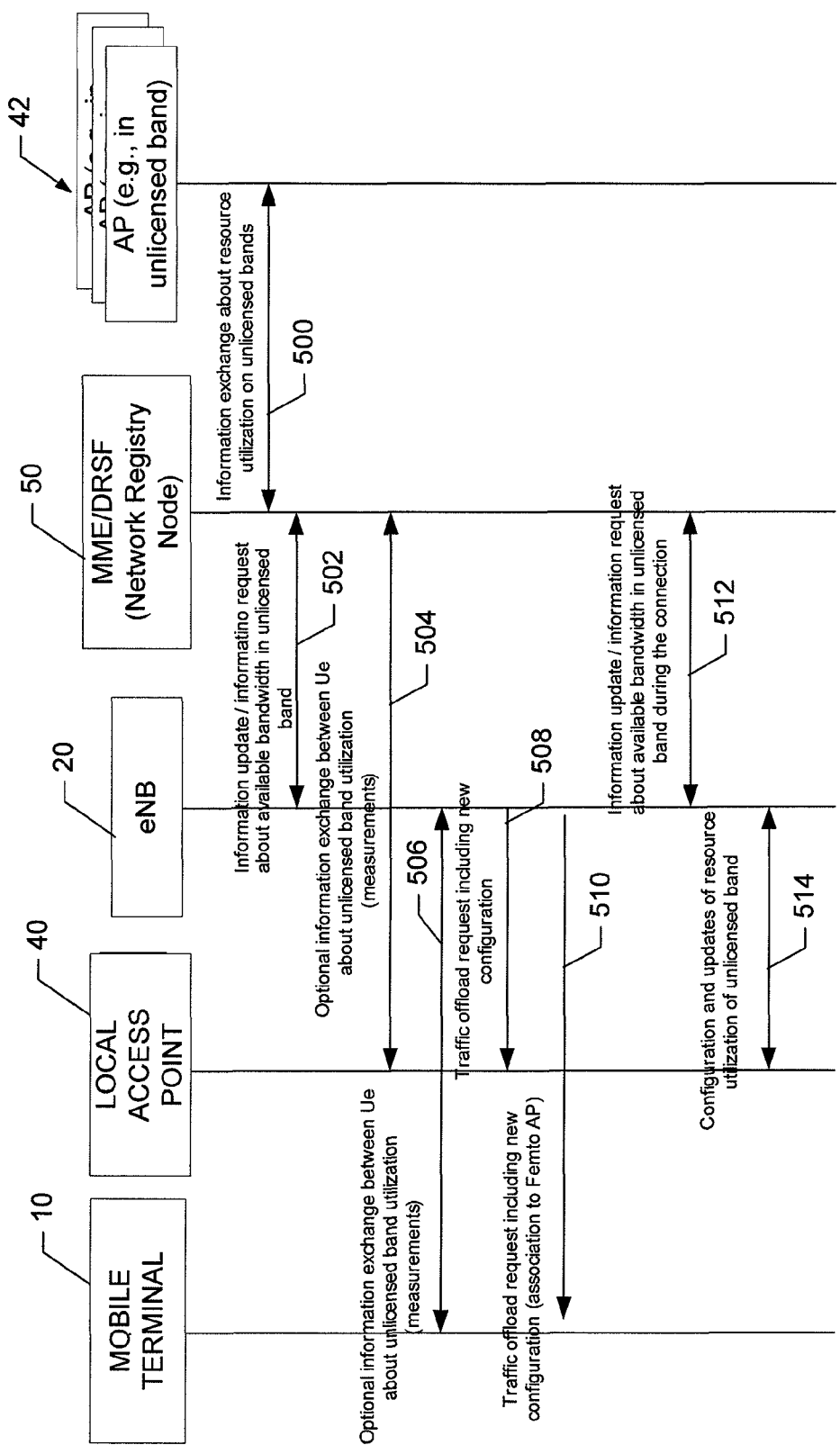
FIG. 7 is a control flow diagram showing some communication exchanges for offloading by assigning an access point to an unlicensed band according to an example embodiment of the present invention.

Rather than specifically directing a mobile terminal or other communication device to switch to an unlicensed band, in some cases, local access points (e.g., access point 40) may be directed to utilize unlicensed band resources. FIG. 7 is a control flow diagram showing some communication exchanges for offloading by assigning an access point to an unlicensed band according to an example embodiment of the present invention. As indicated above, the network registry node 50 may initially exchange information with any access points 42 in unlicensed bands at operation 500. The information may indicate resource utilization of unlicensed bands. At operation 502, the network registry node 50 may exchange information regarding available bandwidth in unlicensed bands with the eNB 20. In some cases, the information exchange may be providing a request for reports from communication devices or updating of information collected at the network registry node 50 for use in making asset utilization determinations. In some cases, there may be an optional exchange of information directly between the network registry node 50 and a local access point (e.g., access point 40)

regarding measurements related to unlicensed band utilization as indicated at operation 504 and/or an exchange of information between the mobile terminal 10 and the eNB 20 as shown at operation 506. The eNB 20, based on information provided by the network registry node 50 and/or the mobile terminal 10, may direct traffic to be offloaded by the local access point 40 to unlicensed band resources by providing a traffic offload request 508 to the access point 40 to define a new configuration. At operation 510, the eNB 20 may also direct the mobile terminal 10 to adopt a new configuration by associating with the access point 40 (which may be a local femto AP in some cases). Information regarding available bandwidth in unlicensed bands may then continue to be exchanged between the network registry node 50 and the eNB 20 at operation 512. Again, the information exchange may be providing a request for reports from communication devices or updating of information collected at the network registry node 50 for use in making asset utilization determinations. At operation 514, configuration information and updates of resource utilization of the unlicensed band may be exchanged between the eNB 20 and the access point 40 as well.

Thus, some embodiments of the present invention may enable configuring and updating info about available radio resources in a particular unlicensed band of interest for possible cellular integrated D2D communications, integrations with M2M communications or other alternative communication paths involving unlicensed band resources. Some examples may employ a network server or other device (e.g., a DRSF, MME or the network registry node 50) that may be configured to initially configure or indicate individual radio access networks that may support heterogeneous local communication (e.g., under supervision of the network device) using unlicensed bands. Thus, for example, the network device may inform other devices about the potential unlicensed band(s) for D2D offload, including information about other systems, cellular or non-cellular, operating in the band(s). These other systems, if trusted, may be connected to the common DRSF. In some embodiments, a mobile terminal assisted option may be implemented to get location based information about usage of unlicensed bands. For example, the mobile terminal 10 may be configured to measure parameters regarding availability of unlicensed band resources and report to such availability to a serving radio access network. The reported parameters may include, for example, interference levels, detectable other systems operating in the unlicensed band, etc. The serving radio access network may update the network device based on the measurement reports of multiple mobile terminals with detailed location mapping. In some embodiments, a radio access network assisted option may be utilized in which a local eNB is responsible for the aforementioned measurement and reporting. In an example case, a local non-cellular system assisted option may be employed in which trusted local AP measurement and reporting to the network device (e.g., a common DRSF) may be accomplished via a packet data network (PDN) Gateway, also with more extended load information. In such an example, a local trusted AP may report to the serving radio access network directly if some mobile terminal, as a cellular monitoring agent, is embedded in the local AP. In situations in which a device finds a new AP, the device may check to determine whether the network device (e.g., DRSF) already has information about the newly discovered AP. If no information is found, the device may register the AP to the DRSF via the licensed spectrum and assist in establishing an interface between the AP and DRSF.

While some heterogeneous local communication may occur in the licensed band under supervision of a certain radio access network, the serving radio access network and the central entity (e.g., the network registry node 50) may interact with each other and try to find unlicensed spectrum for the local communication e.g. when the load in the radio access network is to be decreased for some reason. The signaling and control for local communication may be accomplished via the licensed band. In an example embodiment, the following signaling procedure could be applied (e.g., in LTE/LTE-A) to allocate new resources for the local communication in question.

In an example embodiment, usage of unlicensed band resources may be essentially hidden from the devices involved in a local communication as such devices may still follow control signaling provided in the licensed spectrum. As an example, in the LTE/LTE-A domain, a virtual component carrier could be considered in which the local communication devices are configured on a component carrier that is actually located on the unlicensed spectrum. That component carrier could be considered as a secondary component carrier used by the locally communicating devices for their data transmission and the primary component carrier located on licensed spectrum under supervision of the certain radio access network may be used for control and coordination by the central entity and the serving radio access network. Accordingly, devices may be offloaded to utilized unlicensed resources for D2D or M2M communication. However, in some cases, local access points (and the devices associated therewith) may also be offloaded from licensed to unlicensed bands. The devices may maintain a connection to the primary system (e.g., for control information), but local user plane data may be routed via the unlicensed bands.

In some cases, a plurality of mobile terminals may need to be offloaded and, to avoid contention issues on free secondary band channels, resources may be shared between several mobile terminals (e.g., using time division multiplexing or other scheduling schemes such as a contention based access scheme). The scheduling of a mobile terminal on the secondary band channel may be updated via RRC signaling. Mobile terminals may be allocated some slots (e.g., 1 ms slots) with some periodicity on the free secondary band. In an example embodiment, clustering (e.g., with a cluster head) may be employed with spatially separated clusters providing a way to avoid contention on the secondary band while maximizing reuse of resources. Within a cluster, time and/or frequency division multiplexing modes may be applied.

Thus, some embodiments of the present invention may provide licensed band traffic offloading assisted by the network. Devices that are offloaded may still be connected to the licensed band resources of the initial service network for receipt of certain control commands, but user plane data may be exchanged over a secondary band. Devices can therefore be used for sensing the possible offloading bands and providing information for a central device to ensure fair utilization of the unlicensed band. An entity may therefore be defined to assist in offloading using parameters and configuration data defined by the entity.

Figure 8:
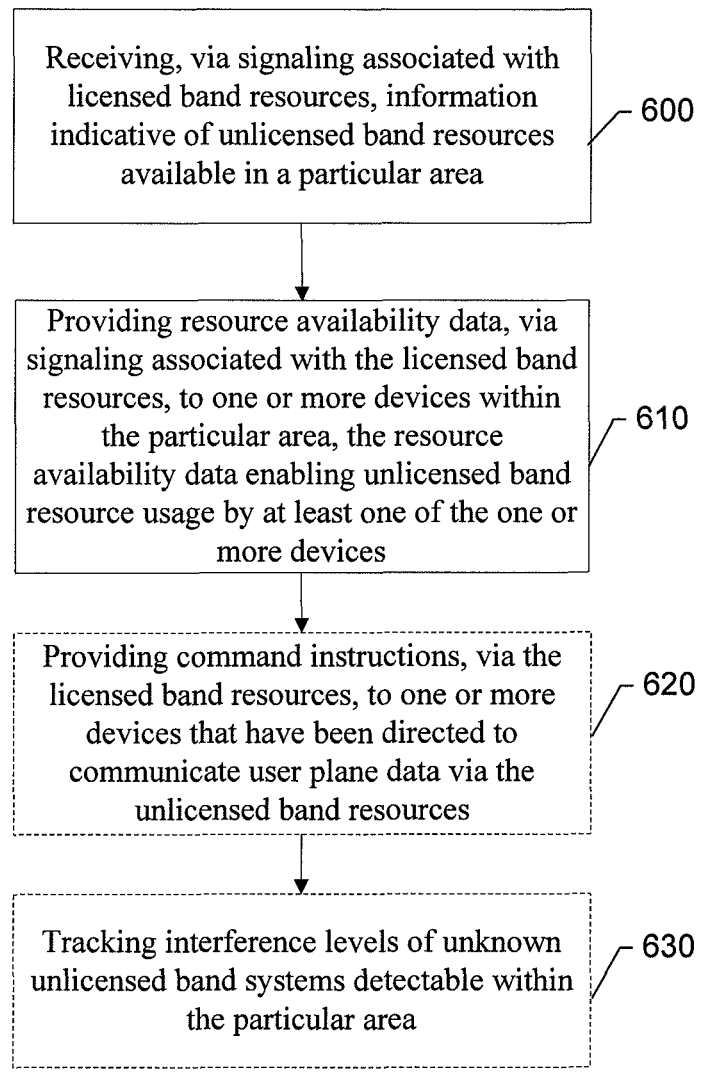
FIG. 8 illustrates a flowchart of a method of providing communication offloading to unlicensed bands in accordance with an example embodiment of the present invention.
Figure 9:
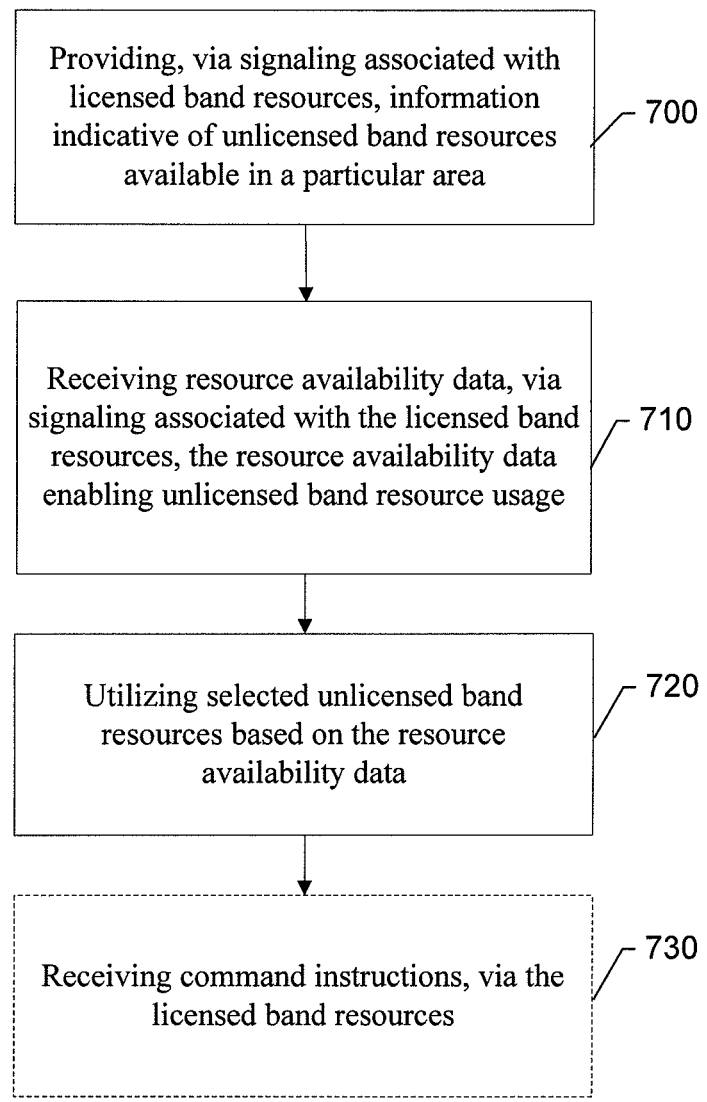
FIG. 9 illustrates a flowchart of another method of providing communication offloading to unlicensed bands in accordance with an example embodiment of the present invention.

FIGS. 8 and 9 are flowcharts of a system, method and program product according to example embodiments of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowcharts block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts block(s).

Accordingly, blocks of the flowchart support combinations of means for performing the specified functions, combinations of operations for performing the specified functions and program instruction means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In this regard, one embodiment of a method for providing network assisted local communication offloading to unlicensed bands, as shown in FIG. 8, includes receiving, via signaling associated with licensed band resources, information indicative of unlicensed band resources available in a particular area at operation 600 and providing resource availability data, via signaling associated with the licensed band resources, to one or more devices within the particular area at operation 610. The resource availability data may enable unlicensed band resource usage by at least one of the one or more devices with or without user awareness. In situations where resource availability data enables usage without user awareness, the usage of unlicensed band resources may be accomplished without user involvement and, without the user being required to be notified of any switch in resources. Thus, the user need not approve of or acknowledge any such shift in resources.

In some embodiments, certain ones of the operations above may be modified or further amplified as described below. Moreover, in some embodiments additional optional operations may also be included (an example of which is shown in dashed lines in FIG. 8). It should be appreciated that each of the modifications, optional additions or amplifications below may be included with the operations above either alone or in combination with any others among the features described herein. In an example embodiment, the method may further include providing command instructions, via the licensed band resources, to one or more devices that have been directed to communicate user plane data via the unlicensed band resources at operation 620. Alternatively or additionally, the method may further include tracking interference levels of unknown unlicensed band systems detectable within the particular area at operation 630. In some cases, receiving the information may include receiving a report on unlicensed band resources from a mobile terminal or an access point (e.g., a femto or pico base station) in the particular area. In some cases, receiving the information may further include storing the information at a network registry for provision to an access point associated with the particular area. In such cases, providing resource availability data comprises indicating availability of unlicensed band resources to the access point. In an alternative embodiment, receiving the information may include receiving the information, at an access point associated with the particular area, from a network registry. In such cases, providing resource availability data may include directing a mobile terminal or access point in the particular area to utilize selected unlicensed band resources. Alternatively or additionally, providing resource availability data may include identifying a secondary frequency and bandwidth for use of unlicensed band resources by one or more devices in the particular area. In some embodiments, providing resource availability data may include utilizing a virtual component carrier for use of unlicensed band resources by one or more devices in the particular area.

Another embodiment of a method for providing network assisted local communication offloading to unlicensed bands (from the perspective of a mobile terminal), as shown in FIG. 9, includes providing, via signaling associated with licensed band resources, information indicative of unlicensed band resources available in a particular area at operation 700 and receiving resource availability data, via signaling associated with the licensed band resources, to one or more devices within the particular area at operation 710. The resource availability data may enable unlicensed band resource usage by a mobile terminal performing the method with or without user awareness. In situations where resource availability data enables usage without user awareness, the usage of unlicensed band resources may be accomplished without user involvement and, without the user being required to be notified of any switch in resources. Thus, the user need not approve of or acknowledge any such shift in resources. The method may further include utilizing selected unlicensed band resources based on the resource availability data at operation 720.

In some embodiments, certain ones of the operations above may be modified or further amplified as described below. Moreover, in some embodiments additional optional operations may also be included (an example of which is shown in dashed lines in FIG. 9). It should be appreciated that each of the modifications, optional additions or amplifications below may be included with the operations above either alone or in combination with any others among the features described herein. In an example embodiment, the method may further include receiving command instructions, via the licensed band resources at operation 730. In some cases, providing the information may further include providing the information for storage at a network registry for provision to an access point associated with the particular area. In some embodiments, receiving resource availability data may include receiving information identifying a secondary frequency and bandwidth for use of unlicensed band resources.

In an example embodiment, an apparatus for performing the method of FIG. 8 above may comprise a processor (e.g., the processor 70 or 270) configured to perform some or each of the operations (600-630) described above. The processor may, for example, be configured to perform the operations (600-630) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 600-630 may comprise, for example, the processor 70 or 270, the communication manager 52, the network registry node 50, and/or a device or circuit for executing instructions or executing an algorithm for processing information as described above.

In an example embodiment, an apparatus for performing the method of FIG. 9 above may comprise a processor (e.g., the processor 170) configured to perform some or each of the operations (700-730) described above. The processor may, for example, be configured to perform the operations (700-730) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 700-730 may comprise, for example, the processor 170, the management entity 54, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving, at a registry node, from one or more of access points, evolved node Bs (eNBs), local access points, and mobile terminals, via signaling associated with licensed band resources, information indicative of unlicensed band resources available in a particular area; and
   transmitting from one or more of the registry node, the access points, the eNBs, the local access points, and the mobile terminals to a local access point an instruction to cause the local access point to switch from licensed band resources to unlicensed band resources based on the available bandwidth of the unlicensed band.

2. The method of claim 1, wherein receiving the information comprises receiving a report on unlicensed band resources from a mobile terminal in the particular area.

3. The method of claim 1, wherein receiving the information comprises receiving a report on unlicensed band resources from an access point in the particular area.

4. The method of claim 1, wherein receiving the information further comprises storing the information at a network registry for provision to an access point associated with the particular area.

5. The method of claim 4, wherein providing resource availability data comprises indicating availability of unlicensed band resources to the access point.

6. The method of claim 1, wherein receiving the information comprises receiving the information from a network registry, the information being received at an access point associated with the particular area.

7. The method of claim 6, wherein providing resource availability data comprises directing a mobile terminal or access point in the particular area to utilize selected unlicensed band resources.

8. The method of claim 6, wherein providing resource availability data comprises identifying a secondary frequency and bandwidth for use of unlicensed band resources by one or more devices in the particular area.

9. The method of claim 1, further comprising providing command instructions, via the licensed band resources, to one or more devices that have been directed to communicate user plane data via the unlicensed band resources.

10. The method of claim 1, further comprising tracking interference levels of unknown unlicensed band systems detectable within the particular area.

11. The method of claim 1, wherein providing resource availability data comprises utilizing a virtual component carrier for use of unlicensed band resources by one or more devices in the particular area.

12. An apparatus comprising at least one processor and at least one memory including computer program code, the at least one memory and the computer program code configured to, with the processor, cause the apparatus to at least:
    receive, via signaling associated with licensed band resources, information indicative of unlicensed band resources available in a particular area; and
    transmit to a local access point an instruction to cause the local access point to switch from licensed band resources to unlicensed band resources based on the available bandwidth of the unlicensed band.

13. The apparatus of claim 12, wherein the memory and computer program code are configured to, with the processor, cause the apparatus to receive the information by receiving a report on unlicensed band resources from a mobile terminal or an access point in the particular area.

14. The apparatus of claim 12, wherein the memory and computer program code are configured to, with the processor, cause the apparatus to store the information at a network registry for provision to an access point associated with the particular area, wherein providing resource availability data comprises indicating availability of unlicensed band resources to the access point.

15. The apparatus of claim 12, wherein the memory and computer program code are configured to, with the processor, cause the apparatus to receive the information by receiving the information from a network registry, the information being received at an access point associated with the particular area, wherein providing resource availability data comprises directing a mobile terminal or access point in the particular area to utilize selected unlicensed band resources or identifying a secondary frequency and bandwidth for use of unlicensed band resources by one or more devices in the particular area.

16. The apparatus of claim 12, wherein the memory and computer program code are configured to, with the processor, cause the apparatus to provide command instructions, via the licensed band resources, to one or more devices that have been directed to communicate user plane data via the unlicensed band resources.

17. An apparatus comprising at least one processor and at least one memory including computer program code, the at least one memory and the computer program code configured to, with the processor, cause the apparatus to at least:

receive resource availability data, via signaling associated with the licensed band resources, the resource availability data enabling unlicensed band resource usage by at least one of the one or more devices; and transmit to a local access point an instruction to cause the local access point to switch from licensed band resources to unlicensed band resources based on the available bandwidth of the unlicensed band.

18. The apparatus of claim 17, wherein the memory and computer program code are further configured to, with the processor, cause the apparatus to receive command instructions, via the licensed band resources.

19. The apparatus of claim 17, wherein the memory and computer program code are configured to, with the processor, cause the apparatus to provide the information by providing the information for storage at a network registry for provision to an access point associated with the particular area.

20. The apparatus of claim 17, wherein the memory and computer program code being configured to, with the processor, cause the apparatus to receive resource availability data comprises receiving information identifying a secondary frequency and bandwidth for use of unlicensed band resources.

\* \* \* \* \*